A. B. LATTA.
Lamp.
No. 39,154.
Patented July 7, 1863
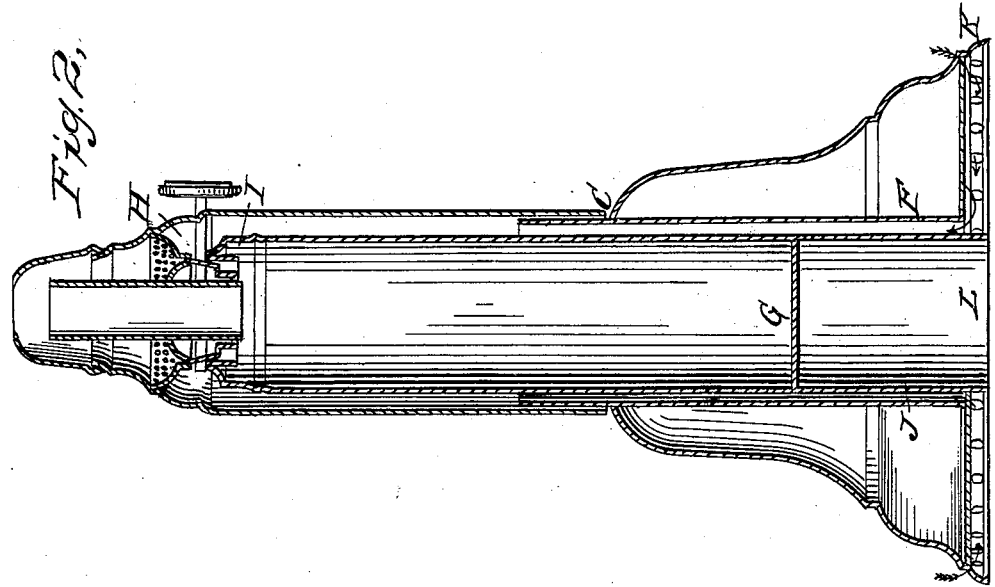
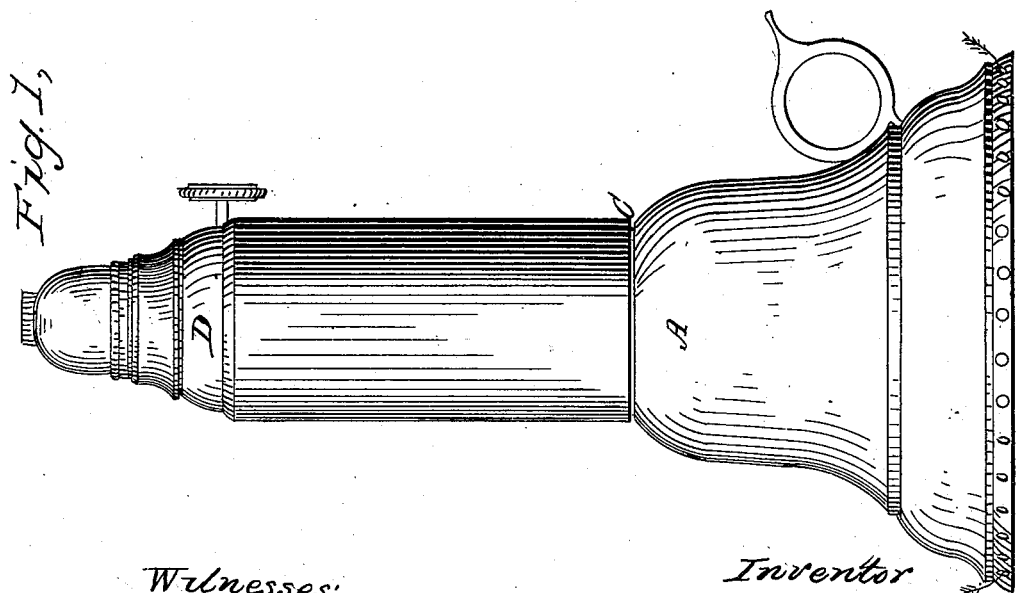
Witnesses:
A. Smith
Joseph Alem
Inventor
A. B. Latta.

UNITED STATES PATENT OFFICE.

ALEXANDER B. LATTA, OF CINCINNATI, OHIO.

IMPROVEMENT IN LAMPS.

Specification forming part of Letters Patent No. 39,154, dated July 7, 1863.

*To all whom it may concern:*

Be it known that I, ALEXANDER B. LATTA, of the city of Cincinnati, in the county of Hamilton and State of Ohio, have invented a new and useful Improvement in the Mode of Constructing Lamps for Burning Coal-Oil; and I do hereby declare that the following is a full, clear, and exact description of the same, reference being had to the annexed drawings, making a part of this specification, in which—

Figure 1 is a perspective view; Fig. 2, a vertical section cut in the center of Fig. 1.

It will be seen this lamp has a tube or cylinder, J, reaching from the bottom up to the burner. At I this tube J has a bottom, G, in it to prevent the oil from falling to the bottom, as the coil cannot be lifted from the bottom of the lamp. The space above the bottom G contains the oil, which it feeds gradually to the wick. It will be seen that the bottom L runs across the entire base of the lamp, leaving an angular space, F, which leads across the bottom and connects with the holes in the rim K, which furnishes air for said angular space F, which leads direct in a vertical direction to the burner, where the air passes through the perforated disk at H, then comes in contact with the flame. The outer tube, C, is soldered fast to the outside of the burner, in order to conduct the heat to the column of air, thereby giving it a tendency to ascend, and by this means produce a blast on the burner. The outside tube, C, slips off the lower tube at C by unscrewing it. This must be done when the lamp is to be filled.

In Fig. 1 the external part, A, is merely a base to give the lamp stability, and may be made of any suitable material.

B represents the external part of this burner, which serves to bring the air in contact with the flame.

There is no peculiarity in the burner on this lamp, nor is it necessary. Any of the common coal-oil burners will answer if the outer part is so arranged as to conduct the heat to the ascending air, and at the same time conduct the air properly around the flame.

This lamp may be shortened to some extent, but it must be borne in mind that unless a sufficient draft is produced the lamp will produce an unpleasant odor in a tight room.

The mode of operating this lamp is simply to unscrew the outer tube, C, together with the burner. Then fill the chamber G with oil, putting in a common flat wick. Then trim and light the burner in the same manner as any other lamp, using the thumb-wheel to raise the wick, as is usual in all common lamps.

What I claim, and desire to secure by Letters Patent, is—

1. The connection of a common burner with the inverted metallic chimney C, by means of solder, so as, when used with a simple metallic cone, to make a conductor of heat from the flame to the air inside the chimney, thereby rarefying the air and producing an upward current therein.

2. The combination of the inverted chimney C with the oil-chamber G, when used with a single metallic cone, so as to direct the current of air passing between the inverted chimney C and the oil-chamber G against the flame on all sides, thereby sustaining the flame without the aid of a glass chimney or other appliances.

A. B. LATTA.

Witnesses:
S. HAMBURG,
W. CHIDSEY.